No. 712,034. Patented Oct. 28, 1902.
M. BERGER.
SLIDE CHANGING MECHANISM.
(Application filed June 10, 1902.)

(No Model.) 2 Sheets—Sheet 1.

Witnesses:
Emil Donity
Paul Krüger

Inventor:
Max Berger

No. 712,034. Patented Oct. 28, 1902.
M. BERGER.
SLIDE CHANGING MECHANISM.
(Application filed June 10, 1902.)
(No Model.) 2 Sheets—Sheet 2.

Witnesses:
Emil Drivitz
Paul Krüger

Inventor:
Max Berger

UNITED STATES PATENT OFFICE.

MAX BERGER, OF JENA, GERMANY, ASSIGNOR TO FIRM OF CARL ZEISS, OF JENA, GERMANY.

SLIDE-CHANGING MECHANISM.

SPECIFICATION forming part of Letters Patent No. 712,034, dated October 28, 1902.

Application filed June 10, 1902. Serial No. 110,986. (No model.)

*To all whom it may concern:*

Be it known that I, MAX BERGER, engineer, a subject of the King of Saxony, residing at Carl Zeiss Strasse, Jena, in the Grand Duchy of Saxe-Weimar, German Empire, have invented a new and useful Slide-Changing Mechanism, of which the following is a specification.

Duplex slide-carriers for projection apparatus were hitherto made in the form of sliding double frames carrying consecutively (in the direction of the sliding movement) two slides. When these double frames are guided horizontally, the slide outside the cone of light (the slide awaiting exchange) is in turn on one and the other side of the cone of light, which condition is inconvenient and entails in the case of the larger models of apparatus separate attendance on each side—*i. e.*, requires two persons. This drawback is obviated in the vertical movement where the slides to be interchanged are either above or below the cone of light. The vertical sliding movement is, however, but rarely practicable on account of sufficient space below the cone of light not being usually available.

The duplex slide-carrier constructed according to the present invention neither has the disadvantage peculiar to the horizontal double frame nor is it subject to the limited applicability of the vertical double frame. Two separate carriers are arranged in two different planes at right angles to the axis of the cone of light. Each carrier is capable of such (sliding or revolving) movements that one may be within the cone of light while the other is in the outside position, allowing the slide to be exchanged, and vice versa. Either the objective or each carrier is adjustable in the direction of the cone of light between two stops, so that at each change of carriers the normal distance between objective and slide may easily be restored. The two carriers may be connected in such a way that by a single impulse one or other is put in operative position and the one previously in use put out of the cone of light. An arrangement for shifting automatically the objective or the two carriers in either direction, so as to reëstablish the correct distance between objective and slide, may be combined with the mechanism for operating the carriers.

Figure 1:
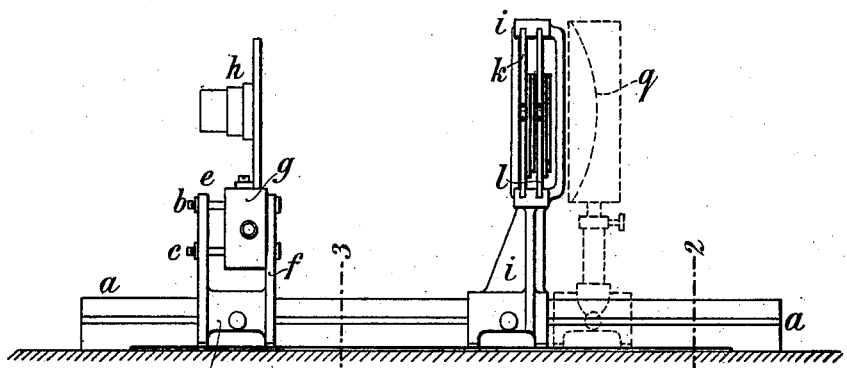
Figure 2:
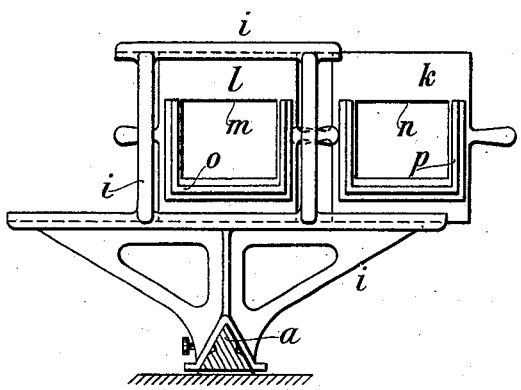
Figure 3:
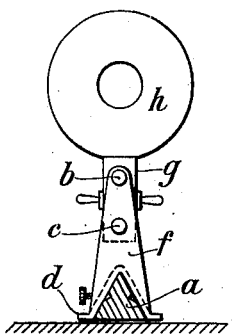
Figure 4:
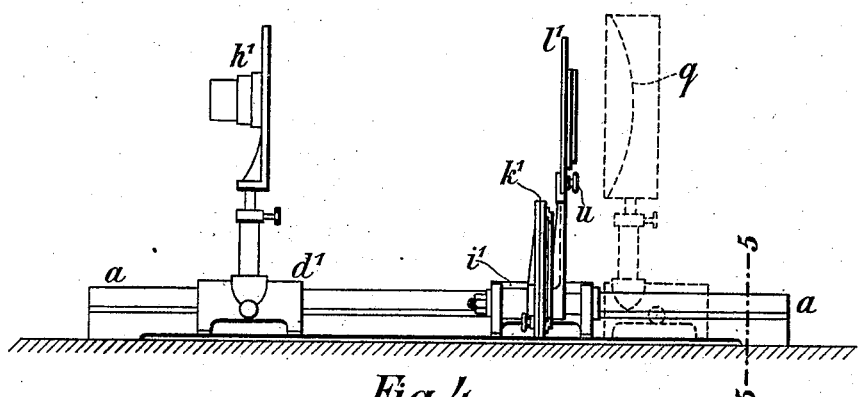
Figure 5:
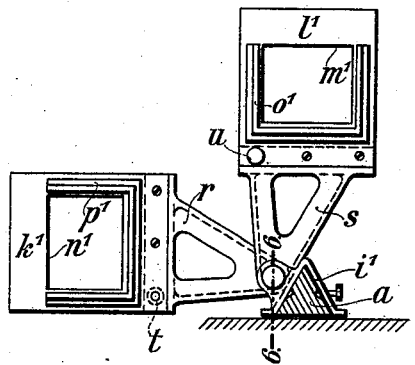
Figure 6:
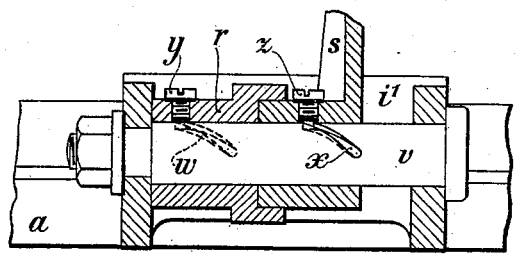

Figure 1 is a side elevation of a sliding duplex carrier combined with a shiftable objective. Fig. 2 is a section on line 2 2 in Fig. 1. Fig. 3 is a section on line 3 3 in Fig. 1. Fig. 4 is a side elevation of a revolving duplex carrier combined with a fixed objective. Fig. 5 is a section on line 5 5 in Fig. 4. Fig. 6 is an enlarged section on line 6 6 in Fig. 5.

The duplex slide-carrier and the objective shown in Figs. 1 to 3 are adjustable along the rail $a$. Two guide-rods $b$ and $c$, parallel to the rail $a$, are fitted to two uprights $e$ and $f$, rising from the adjustable bracket $d$ and acting as stops in shifting the objective $h$, which slides by its foot $g$ along the rods $b$ and $c$. In the upper portion of a second adjustable bracket $i$ the two sliding carriers $k$ and $l$ are guided. For the sake of simplicity the carriers are represented as adapted for slides of horizontal pattern only, being provided with rectangular openings $m$ and $n$ and grooves $o$ and $p$ for inserting the slides. While the slide in carrier $l$ is being exhibited, (in proximity to the illuminating-lens $q$,) carrier $k$ is in the inoperative position and its slide is being changed.

The carriers are changed by pushing carrier $k$ inward and withdrawing carrier $l$. The distance between the objective $h$ and the slide in the carrier $k$ is then too short by the amount of the distance between the two carriers. Therefore the objective must be moved away an equal distance—namely, till its foot $g$ comes in contact with the stop $e$.

In the arrangement illustrated by Figs. 4 to 6 the objective $h'$ is fixed upon its bracket $d'$. The two carriers $k'$ and $l'$ are movably connected with the bracket $i'$ by means of their arms $r$ and $s$. They are provided with openings $m'$ and $n'$ and with grooves $o'$ and $p'$, also with knobs $t$ and $u$ for the convenience of handling. As shown in Fig. 6, the bracket $i'$ is fitted with an axle $v$, having two short screw-grooves $w$ and $x$ of equal but opposite pitch. The extremities of the carrier-arms $r$ and $s$ are fitted as sleeves on the axle $v$ and engage by the pins $y$ and $z$ into the grooves $w$ and $x$ of this axle. The length and pitch of these grooves are such that each of the two carriers may make a revolution of ninety degrees, undergoing at the same time a displacement in the direction of the rail $a$ equal to the distance between the two carriers. The drawings show carrier $l'$ in operation and carrier $k'$ inactive.

To change the carriers, the knob $t$ is seized and carrier $k'$ screwed up into the operative position. Simultaneously, by reason of the axial pressure of arm $r$ upon arm $s$, carrier $l'$ is automatically screwed into the inoperative (lower) position. The carrier $k'$ by its helical movement arrives at exactly the same position previously occupied by carrier $l'$, so that the objective $h'$ needs not to be shifted.

It will be understood that in the example Figs. 4 to 6 stops for easily restoring the distance between the objective and the slide when the carriers are changed are applied analogous to the objective stops $e$ and $f$ in the first example. In the second example these stops are carrier-stops and consist in the end walls of the helical grooves $w$ and $x$. They confine the displacement of the carriers in the direction of the cone of light and by reason of the peculiar combination of the correcting displacement with the changing movement proper also their revolution.

What I claim as my invention, and desire to secure by Letters Patent, is—

1. In a projection apparatus the combination with two separate slide-carriers arranged in different planes at right angles to the axis of the cone of light and movable so as to be simultaneously one in and the other out of the cone of light, of means for restoring the distance between the slide and the objective, when the carriers are changed, such means comprising a set of stops, which confine the relative displacement between the carriers and the objective, essentially as described.

2. In a projection apparatus the combination with two separate slide-carriers arranged in different planes at right angles to the axis of the cone of light and connected together so as to be moved by the same impulse one into and the other out of the cone of light, of means for restoring the distance between the slide and the objective, when the carriers are changed, such means comprising a set of stops, which confine the relative displacement between the carriers and the objective, essentially as described.

3. A duplex slide-carrier comprising two separate carriers arranged in different planes at right angles to the axis of the cone of light and connected together so as to be moved by the same impulse, one into and the other out of the cone of light, and both in the direction of the cone of light for restoring the proper distance between the slide and the objective, and a set of stops confining the movements of the carriers, essentially as described.

In testimony whereof I have signed my name to this specification in the presence of two subscribing witnesses.

MAX BERGER.

Witnesses:
 EMIL DÖNITZ,
 PAUL KRÜGER.